(12) United States Patent
Kume

(10) Patent No.: US 6,837,025 B2
(45) Date of Patent: Jan. 4, 2005

(54) HIGH-FREQUENCY HEAT-SEALING APPARATUS

(75) Inventor: Satoshi Kume, Itano-gun (JP)

(73) Assignee: Shikoku Kakoki Co., Ltd., Itano-gun (JP)

( * ) Notice: Subject to any disclaimer, the term of this patent is extended or adjusted under 35 U.S.C. 154(b) by 44 days.

(21) Appl. No.: 10/067,828

(22) Filed: Feb. 8, 2002

(65) Prior Publication Data

US 2002/0157349 A1 Oct. 31, 2002

(30) Foreign Application Priority Data

Feb. 27, 2001 (JP) .................................. 2001-052817

(51) Int. Cl.$^7$ .................................................. B65B 5/10
(52) U.S. Cl. ................ 53/374.2; 53/371.2; 53/DIG. 2; 156/580.1; 156/581; 156/583.1
(58) Field of Search ............................ 53/373.7, 374.2, 53/374.3, 374.5, 374.6, 371.2, DIG. 2; 156/583.1, 581, 580.1, 580.2, 380.2

(56) References Cited

U.S. PATENT DOCUMENTS

| | | | |
|---|---|---|---|
| 3,488,914 A | * | 1/1970 | Csernak .................... 53/374.5 |
| 3,530,642 A | * | 9/1970 | Leimert .................... 53/374.6 |
| 4,704,509 A | * | 11/1987 | Hilmersson et al. ..... 156/380.2 |
| 6,276,114 B1 | | 8/2001 | Hayashi |
| 6,294,046 B1 | | 9/2001 | Kume et al. |
| 6,482,291 B1 | * | 11/2002 | Kume et al. ............. 156/580.1 |

FOREIGN PATENT DOCUMENTS

| | | |
|---|---|---|
| EP | 0 979 723 A2 | 2/2000 |
| EP | 0 990 587 A2 | 4/2000 |
| JP | 55-3215 | 1/1980 |
| JP | 58-134744 | 8/1983 |
| JP | 62-52025 | 3/1987 |
| JP | 1-23366 | 5/1989 |
| JP | 03148426 A * | 6/1991 ........... B65B/51/10 |
| JP | 5-269854 | 10/1993 |
| JP | 7-164523 | 6/1995 |
| JP | 8-230834 | 9/1996 |
| JP | 8-244728 | 9/1996 |
| JP | 2571977 | 10/1996 |
| JP | 9-240607 | 9/1997 |
| JP | 2000-53110 | 2/2000 |
| JP | 2000-103413 | 4/2000 |

* cited by examiner

Primary Examiner—Stephen F. Gerrity
(74) Attorney, Agent, or Firm—Westerman, Hattori, Daniels & Adrian, LLP

(57) ABSTRACT

To provide a heat-sealing apparatus capable of achieving an excellent heat-sealing wherein no generation of defective sealing is found even when heat-sealing under severe conditions with a fluid, such as when filling/packing a vegetable juice abundant in water-insoluble vegetable fiber, without providing a ridge on the action face of a high-frequency coil. The high-frequency heat-sealing apparatus consists of a sealing jaw 23 provided with an openable-and-closable high-frequency coil 22 and an opposing jaw 25 provided with a sealing rubber 24 having a flat action face, which transversely heat-seals a tubular packing material with a fluid, wherein a groove 26 inscribed in the end portion on the container's interior side of the sealed zone where both right and left sides are rounded and narrowed, is extended, on the action face of the sealing jaw, over the whole area in the longitudinal direction along the container's interior side of the sealed zone, and a flash portion 27 for a molten resin is formed adjacent to the outer side on the cutting side of the high-frequency coil. The aforementioned groove 26 may be a groove wherein its width partially differs.

9 Claims, 6 Drawing Sheets

[Fig. 1]
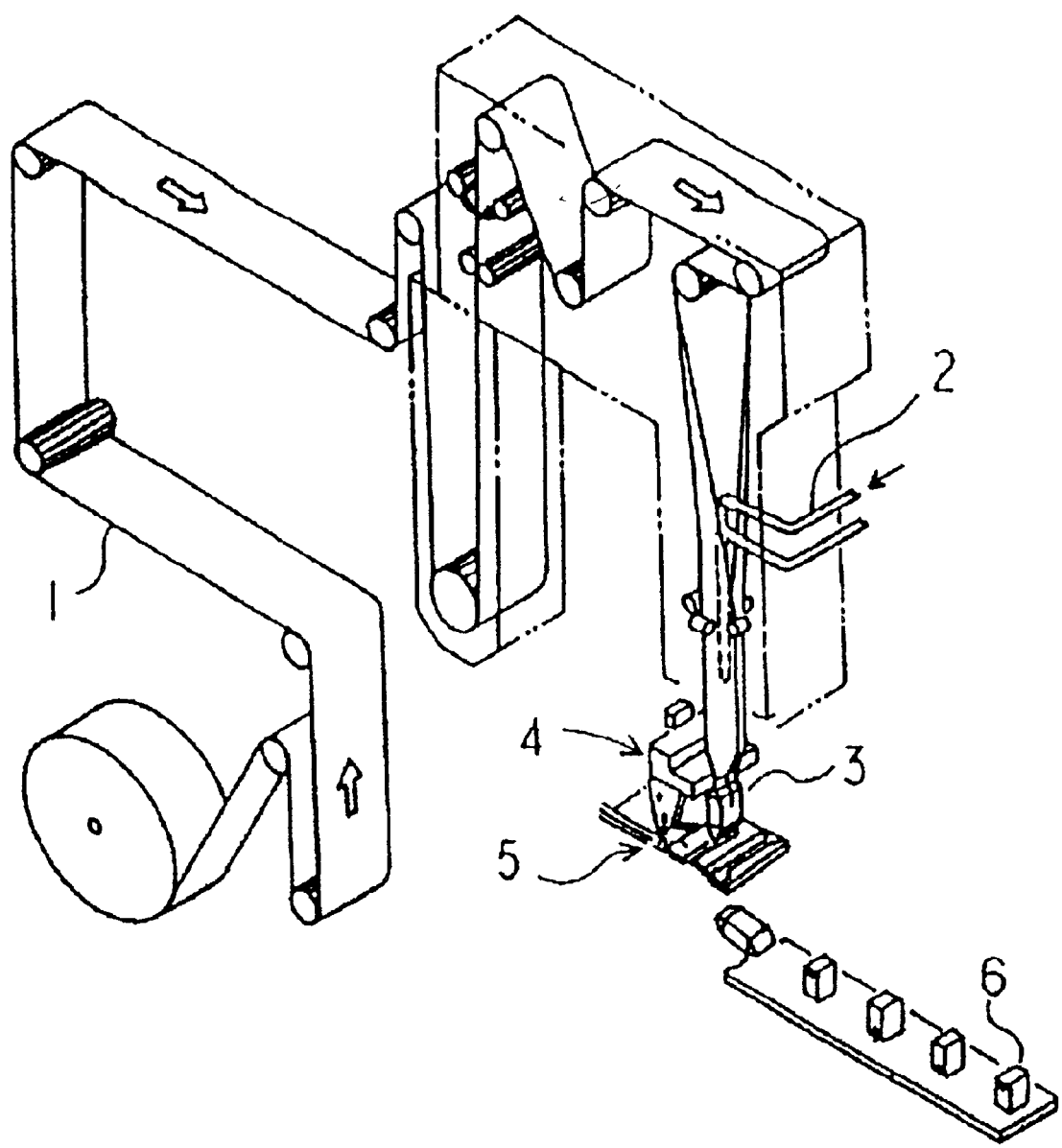

[Fig. 2]
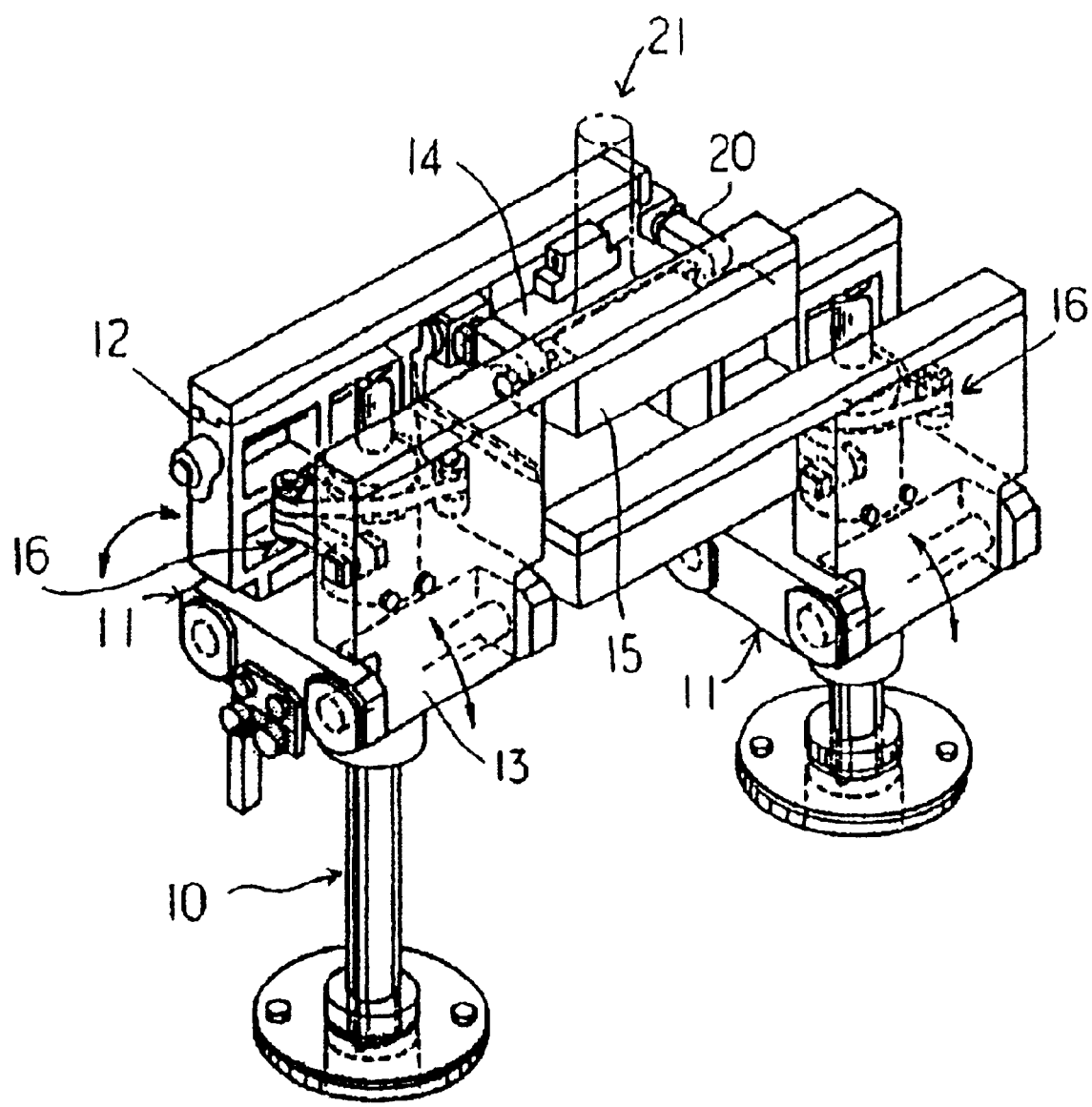

[Fig. 3]
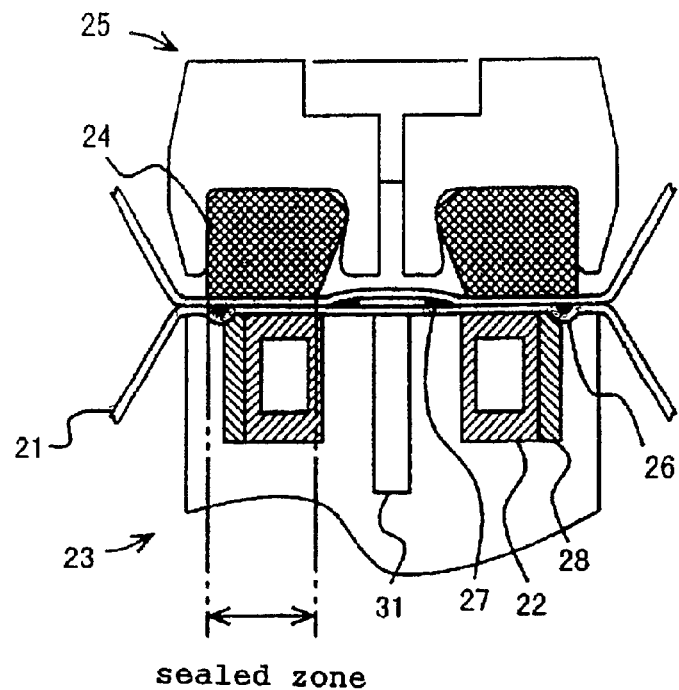
sealed zone
[Fig. 4]
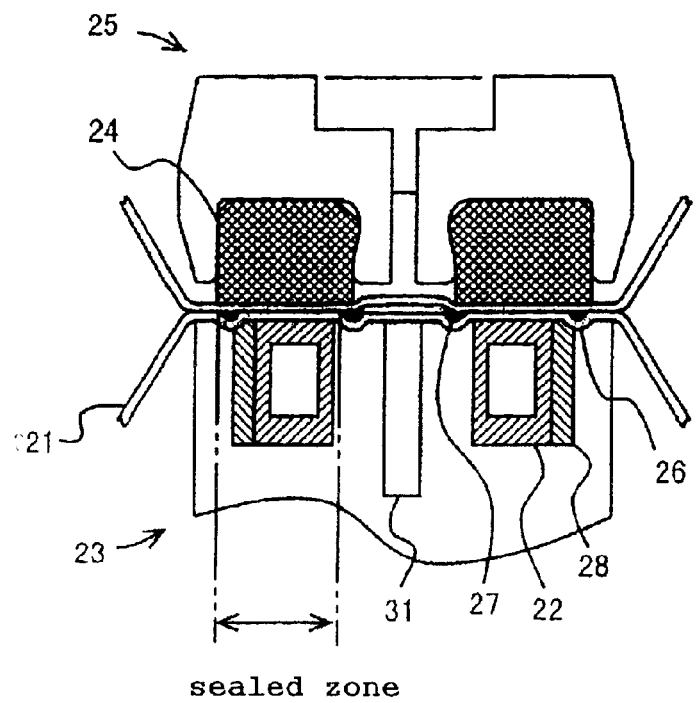
sealed zone

[Fig. 5]
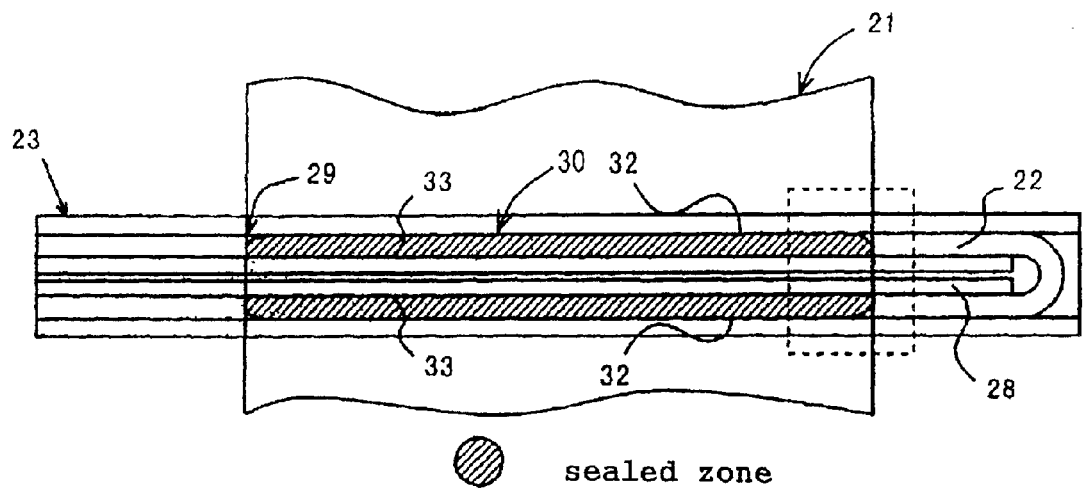
sealed zone
[Fig. 6]
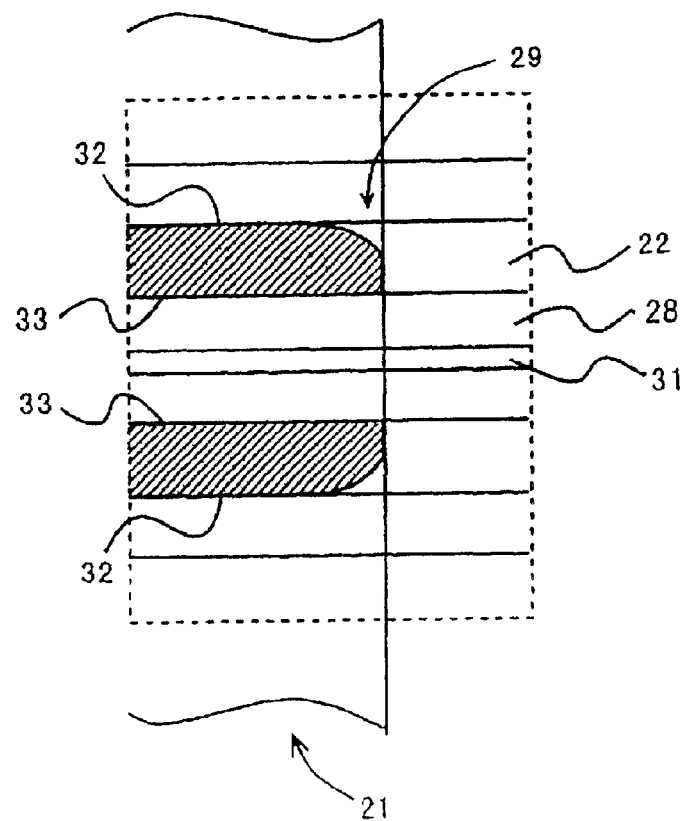

[Fig. 7]
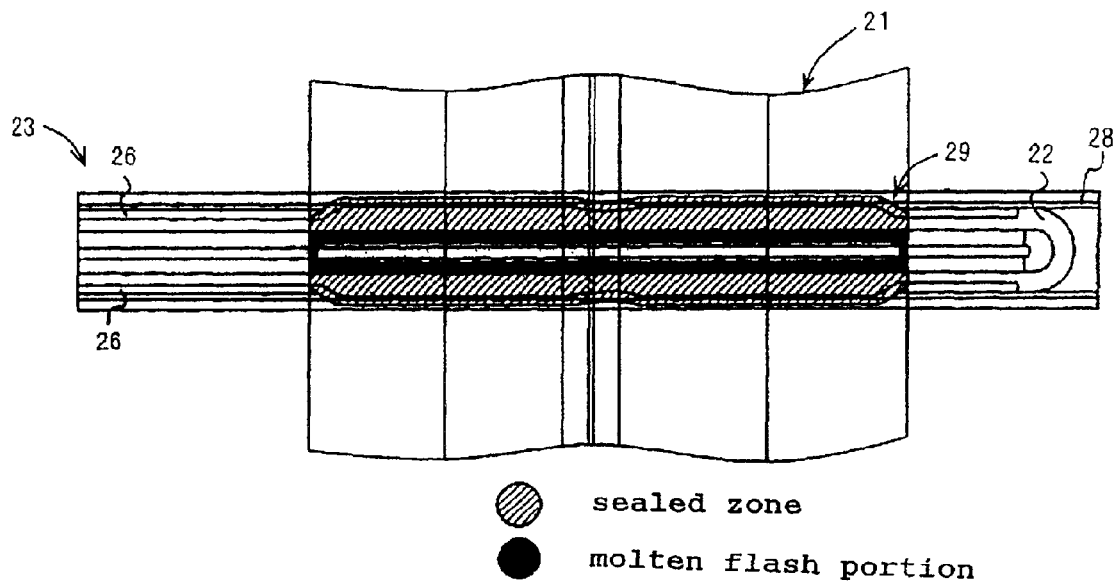
[Fig. 8]
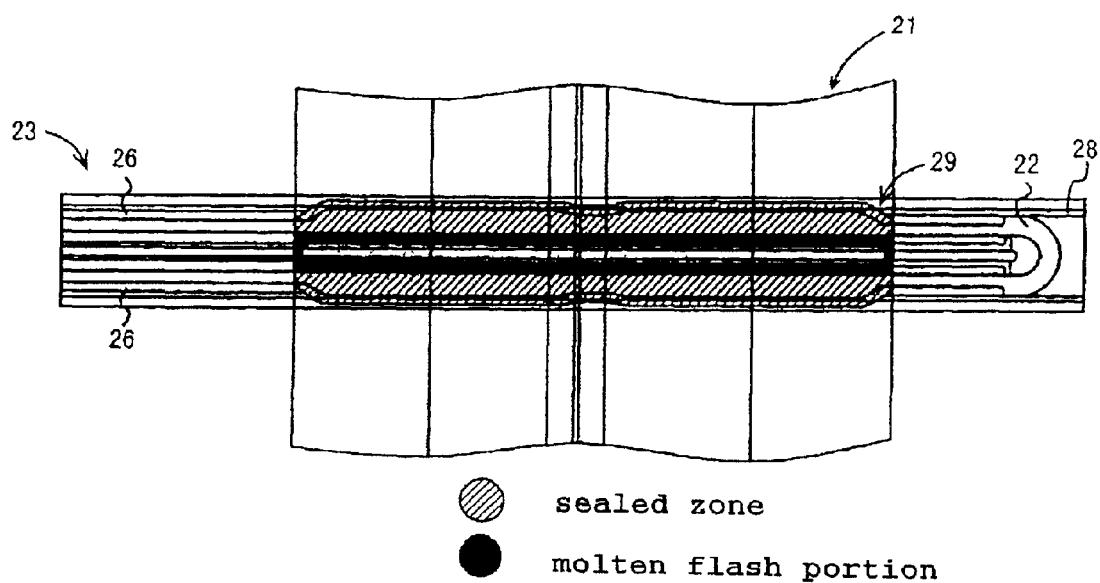

[Fig. 9]
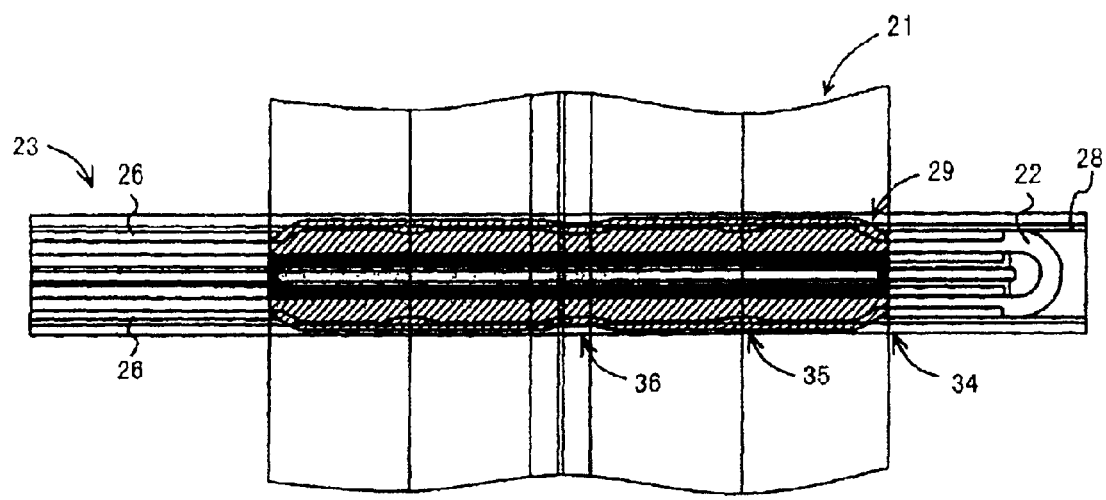

HIGH-FREQUENCY HEAT-SEALING APPARATUS

BACKGROUND OF THE INVENTION

1. Field of the Invention

The present invention relates to a high-frequency heat-sealing apparatus for use in a filling/packing machine for producing liquid beverages or the like which are packed in paper containers so that they can be stored for a long time, and more particularly, to a high-frequency heat-sealing apparatus for transversely high-frequency heat-sealing a tubular packing material filled with contents such as liquid beverages, together with a fluid, by using a sealing jaw and an opposing jaw which do not have a ridge on their action faces.

2. Description of the Related Art

Hitherto, when a packing container having a box shape or the like filled with a liquid such as juice in a sealed manner is to be produced, as seen in Japanese Patent Publication No. 3215/1980, it is well known to use a sealing apparatus in which a packing material of a laminate of paper, an aluminum foil and a synthetic resin is used and continuously formed into a tubular shape while being conveyed. The tubular packing material is transversely heat-sealed with a fluid by using pressing means including a sealing jaw having a high-frequency coil and an opposing jaw having a sealing rubber of a hard rubber, and is cut between two sealed zones having been heat-sealed by a cutting blade.

Moreover, in Japanese Patent Laid-Open Nos. 134744/1983, 269854/1993, 164523/1995 and 240607/1997, there are other disclosures of a heat-sealing apparatus for heat-sealing a laminate material in which a ridge having a rectangular shape in the cross section is formed on the action face of a high-frequency coil on a sealing jaw in the aforementioned heat-sealing apparatus so that the molten resin is extruded into a sealed zone by the ridge. In order to avoid a problem of the aforementioned heat-sealing apparatus that when the molten resin is guided to flow toward the container's interior side of the sealed portion of a tubular packing material, corrugated molten resin beads are formed on the edge portion of the container's interior side so that cracks start from the crests of the beads to break the container when an external force is applied to the container, two magnetic members are arranged on the outer side (or on the container's interior side) of the straight portions of a U-shaped high-frequency coil to leave the portion of the container inner side unheated, as disclosed in Japanese Patent No. 2,571,977.

Furthermore, in Japanese Patent Laid-Open No. 230834/1996, it is described that in the aforementioned heat-sealing apparatus, a high-frequency coil, which has a ridge in its longitudinal direction and grooves formed on the two sides of and in parallel with the ridge, causes molten resin to remain in the grooves without flowing out of a sealed zone, even if the resin on the packing material is melted and pushed by the ridge. In Japanese Patent Laid-Open No. 244728/1996, it is described that in the aforementioned heat-sealing apparatus, there is the use of a high-frequency coil which is inclined gradually at the more distance as the sealed zone forming portion goes to the outer side (to the container's interior side), so that the tube is heat-sealed whereby the liquid and the molten resin are discharged smoothly from the sealed zone to the container's interior side, when the tube is pressed together with a fluid.

In addition, Japanese Patent Laid-Open No. 53110/2000 discloses a sealing apparatus for shaping a packing material of a laminate including a synthetic resin layer into a tubular shape and for heat-sealing the tubular packing material transversely together with a fluid by using a pair of openable-and-closable pressing members including a heating mechanism, wherein a groove capable of forming a synthetic resin puddle adjacent to the outer side on the container's interior side of a sealed zone is formed on the action face of at least one of the pressing members, whereby complete sealing is achieved by guiding the liquid and dirt that have entered the very small corrugations of the inner face of the tube to flow out of the sealed zone together with the molten resin, and heat-sealing excellent in compressive strength where there is no generation of cracks due to the molten resin that had flown into the container's interior side is achieved.

Moreover, in Japanese Patent Laid-Open No. 103413/2000, it is disclosed that a high-frequency heat-sealing apparatus comprising a pair of openable-and-closable pressing members including a high-frequency heating mechanism for shaping a packing material of a laminate including a synthetic resin layer and a conductive material layer into a tubular shape and for heat-sealing the tubular packing material transversely together with a fluid, wherein a ridge shaped to contain an arcuate partial curve in its transverse contour is so formed on the action face of a high-frequency coil flush with the action face of one of the pressing members that it can press the central portion of a sealed zone having two rounded and narrowed right and left sides, and wherein a flash portion for a molten thermoplastic resin is formed adjacent to the outer side on the cutting side of the high-frequency coil, thereby achieving excellent sealing wherein no contaminants such as liquid beverages exist between the thermoplastic material layer, over the whole area of the longitudinal direction of the sealed zone, including the right and left side portions of the longitudinal direction of the sealed zone when high-frequency heated, where the width of the sealed zone is narrower compared to the width of the non-side portion.

Further, in Japanese Patent Laid-Open No. 52025/1987, it is disclosed that when an electric current flows in a high-frequency coil, a high-frequency electromagnetic field is generated around the high-frequency coil and induces an eddy current in a conductive material such as an aluminum foil, so that heat is generated in the conductive material by the eddy current to heat and melt a thermoplastic resin adjacent to the conductive material. However, the eddy current thus induced establishes round electric circuits at the two end portions of the conductive material such as an aluminum foil, so that the heated regions at the two end portions are also rounded to narrow the width of the thermoplastic material layer to be melted at the two end portions. It is also disclosed a high-frequency coil which has a linear ridge for pressing the center parts of the sealed zone, at the two narrowed right and left side portions or at the non-side portion of the sealed zone.

An Object to be Attained

In order to effect the heat-sealing properly in a high-frequency heat-sealing apparatus for transversely heat-sealing a tubular packing material filled with contents such as a liquid beverage in the presence of the liquid, it is necessary to press the thermoplastic material layers melted by the high-frequency heating, with a ridge provided on the high-frequency coil and to extrude the molten thermoplastic resin together with contaminants such as liquid beverages or the like existing between the thermoplastic material layers, from under the ridge to the two sides of the same, thereby forming a thin layer of the thermoplastic resin containing no contaminant below the ridge. It is true that achieving satisfactory heat-sealing is made possible by providing a ridge, but it did not mean that providing a ridge solved all problems. For example, there was a problem that since the face pressure of the long and narrow region being pressed by the ridge reaches approximately 100 kg/cm$^2$, the physical strength of the press region (heat-sealed portion) becomes weak, thereby causing defective sealing, although rarely, by the damage of the press region under the ridge, when the maintenance and adjustment of the press control mechanism of the high-frequency heat-sealing apparatus is insufficient, or when the product being packed is handled in a disorderly manner. In addition, there was also a problem caused by the intensive load to the ridge portion of the high-frequency coil provided on the action face of the pressing member of a heat-sealing apparatus that was operated at high speed, wherein the work life of the pressing member was short, because of local wear-out of the ridge portion, or of the deformation of the portion that corresponds to the sealing rubber of the opposing jaw, and after activation of a relatively short period of time, replacement was needed.

On the other hand, the invention described in the aforementioned Japanese Patent Laid-Open No. 53110/2000 by the present inventors is known as a high-frequency heat-sealing apparatus that does not always need a ridge. In this heat-sealing apparatus, a groove that can form a synthetic resin puddle adjacent to the outer side on the container's interior side of a sealed zone is provided on the action face flush with the action face of a high-frequency coil, thereby making it a high quality heat-sealing apparatus capable of achieving a satisfactory sealing by guiding the liquid and dirt that have entered the very small corrugation in the inner face of the tube to flow out of the sealed zone together with the molten resin, and achieving heat-sealing excellent in compressive strength where no cracks are produced by the molten resin that has flown into the container's interior side. However, even with the use of this high-quality heat-sealing apparatus, it could not be said that the heat-sealing performance was sufficient under severe conditions with a fluid. For example, when a vegetable juice abundant in water-insoluble vegetable fiber is high-frequency heat-sealed with a fluid by using the aforementioned heat-sealing apparatus, although the cause is unknown, there were cases wherein products with defective sealing were detected at a proportion of a few to a million. An object of the present invention is to provide a very high-quality heat-sealing apparatus capable of achieving an excellent heat-sealing without providing a ridge on the action face of the high-frequency coil, wherein no defective sealing is generated even when heat-sealing under severe conditions with a fluid, such as when filling/packing a vegetable juice abundant in water-insoluble vegetable fiber.

Means to Attain the Object

In order to attain the aforementioned object, the inventors of the present invention have conducted intensive study, and manufactured many prototype heat-sealing apparatuses that do not have a ridge, effected actual heat-sealing to all of these, and observed in minute details the flow state of the molten thermoplastic resin and vegetable fiber of a sealed zone. More specifically, a sample in which vegetable juice abundant in vegetable fiber was heat-sealed with a fluid, was cut to an appropriate size, and was cut into laminae by a microtome (Japan Microtome Ltd., "RM-S model") equipped with a diamond knife (Drukker International), in a condition wherein it was embedded in ice by using an electronic sample freezing apparatus (Japan Microtome Ltd., "EF-10 model"), and was observed and filmed by using a microscope. From the results of this study, it was discovered that when a groove inscribed in the end portion on the container's interior side of the sealed zone in which the two right and left sides are rounded and narrowed is extended over the whole area of the longitudinal direction, along the container's interior side of the sealed zone on the action face of a pressing member provided with a high-frequency coil, and a flash portion for the molten thermoplastic resin is formed adjacent to the outer side on the cutting side of the sealed zone, an excellent heat-sealing can be achieved by adopting appropriate shape, width, depth, etc, of the aforementioned groove, where there is no defective sealing even when heat-sealing under severe conditions with a fluid, such as when filling/packing vegetable juice abundant in water-insoluble vegetable fiber. It had also been discovered that a more proper heat-sealing is possible by partially changing the width of the groove and controlling the condition of the flow of the molten thermoplastic resin. The present invention had been completed based on this knowledge.

The first aspect of the present invention relates to a high-frequency heat-sealing apparatus comprising a pair of openable-and-closable pressing members including a high-frequency heating mechanism for shaping a packing material of a laminate including a thermoplastic resin layer and a conductive material layer into a tubular shape and for heat-sealing said tubular packing material transversely together with a fluid, wherein a high-frequency coil that can form a flat action face is equipped on one of the pressing members, wherein a groove inscribed in the end portion on the container's interior side of a sealed zone is formed on the action face of the pressing member which had been equipped with said high-frequency coil, and wherein a flash portion for a molten thermoplastic resin is formed adjacent to the outer side on the cutting side of the sealed zone. The second aspect of the present invention relates to the high-frequency heat-sealing apparatus according to the first aspect, wherein the other pressing member is a sealing rubber having an action face. The third aspect of the present invention relates to the high-frequency heat-sealing apparatus according to the first or second aspect, wherein the groove inscribed in the end portion on the container's interior side of the sealed zone is a groove including a partial curve, extended over the whole area of the longitudinal direction along the container's interior side of the sealed zone. The fourth aspect of the present invention relates to the heat-sealing apparatus according to any of the first to third aspects, wherein the cross section of the groove is arcuate, and the depth of the groove is no greater than one half of its width. The fifth aspect of the present invention relates to the heat-sealing apparatus according to any of the first to fourth aspects, wherein the width of the groove partially differs. The sixth aspect of the present invention relates to the high-frequency heat-sealing apparatus according to any of the first to fifth aspects, wherein a band-shaped magnetic member is provided adjacent to the outer side on the container's interior side of the high-frequency coil.

BRIEF EXPLANATION OF DRAWINGS

FIG. 1 is a schematic perspective view of a filling/packing machine wherein a high-frequency heat-sealing apparatus in the present invention is used.

FIG. 2 is a perspective view of a transverse sealing apparatus of the filling/packing machine shown in FIG. 1.

FIG. 3 is a schematic longitudinal section of a high-frequency heat-sealing apparatus in the present invention.

FIG. 4 is a schematic longitudinal section view of a high-frequency heat-sealing apparatus in the present invention in a different mode.

FIG. 5 is an explanatory diagram of a sealed zone in a high-frequency heat-sealing apparatus.

FIG. 6 is an enlarged diagram of a portion of the edge portion of a sealed zone in FIG. 5.

FIG. 7 is an explanatory diagram of a high-frequency heat-sealing apparatus in the present invention described in FIG. 3.

FIG. 8 is an explanatory diagram of a high-frequency heat-sealing apparatus in the present invention described in FIG. 4.

FIG. 9 is an explanatory diagram of a high-frequency heat-sealing apparatus in the present invention wherein the width of the groove differs partially.

DETAILED DESCRIPTION OF THE PREFERRED EMBODIMENTS

The high-frequency heat-sealing apparatus of the present invention will now be described by referring to the appropriate figure. FIG. 1 is a schematic perspective view of a filling/packing machine wherein the high-frequency heat-sealing apparatus in the present invention is used, FIG. 2 is a perspective view of a transverse sealing apparatus of the filling/packing machine, FIG. 3 is a schematic longitudinal section of the high-frequency heat-sealing apparatus in the present invention, FIG. 4 is a schematic longitudinal section of a high-frequency heat-sealing apparatus of the present invention in a different mode, FIG. 5 is an explanatory diagram of a sealed zone in a high-frequency heat-sealing apparatus, FIG. 6 is an enlarged diagram of a portion of the end portion of a sealed zone in FIG. 5, FIG. 7 is an explanatory diagram of a high-frequency heat-sealing apparatus in the present invention described in FIG. 3, FIG. 8 is an explanatory diagram of a high-frequency heat-sealing apparatus in the present invention described in FIG. 4, and FIG. 9 is an explanatory diagram of the high-frequency heat-sealing apparatus of the present invention wherein the with of the groove partially differs.

A filling/packing machine, in which a high-frequency heat-sealing apparatus according to the present invention is used, can be exemplified, as shown in FIG. 1, by a filling/packing machine comprising: a rewinder supporting a packing material web 1 in a roll shape; a rewinding apparatus for rewinding the web sequentially from the rewinder; a tube shaping apparatus for shaping the rewound web, after sterilized, into a tubular shape; a liquid supply pipe 2 for filling the tubular web with a fluid content; a transverse sealing apparatus 4 for transversely sealing the tube filled with the content, while being fed downward by a length substantially corresponding to one container, to continuously shape pillow-shaped containers 3; a cutting apparatus 5 disposed below the transverse sealing apparatus for cutting the sealed portions of the pillow-shaped containers in the suspended state to separate the containers one by one; and a container shaping apparatus for bending the end portions of the pillow-shaped container 3 separated, to shape them into box-shaped containers 6 in a final shape.

As the aforementioned transverse sealing apparatus 4, there can be used one disclosed in Japanese Patent Publication No. 23366/1989, for example. This transverse sealing apparatus 4 is constructed, as shown in FIG. 2, to include: a vertical rod 10 made movable up and down and rotatable back and forth; a lift frame 11 made movable up and down together with the vertical rod 10 and mounted on the vertical rod 10; a pair of front and back rocking arms 12 and 13 individually supported on the lift frames 11 so that they can rock at their lower portions on a pair of horizontal axes parallel to each other; pressing members 14 and 15 provided with a pair of high-frequency coils individually fixed to oppose each other on the upper portions of the individual rocking arms 12 and 13; an arm opening/closing device 16 for rocking the two rocking arms 12 and 13 between a closed position, in which the two pressing members 14 and 15 approach each other, and an open position in which they are apart from each other; and a press apparatus 20 for pulling the two rocking arms 12 and 13 to each other in the closed position to generate a sealing pressure between the two pressing members 14 and 15.

The packing material, as made of a laminate including a thermoplastic resin layer and a conductive material layer in the present invention, may be any of laminates which include a thermoplastic resin layer such as polyethylene, capable of heat-sealing on its innermost face by heating means, and a conductive material layer to be heated by high-frequency heating, and the conductive material layer is preferred to be made of an aluminum foil layer for preventing a light or oxygen from entering the inside of a container. From the standpoint of keeping the rigidity of the container, it is preferable to use a laminate having a paper sheet layer. Moreover, this packing material is shaped into a tubular shape by thermally welding its longitudinal end edge portions without any liquid by the method known in the related art.

The high-frequency heat-sealing apparatus of the present invention is constructed to include the paired openable-and-closable pressing members 14 and 15 which are equipped with a high-frequency heating mechanism for heat-sealing such tubular packing material 21 transversely with the fluid. The paired pressing members 14 and 15 in this high-frequency heat-sealing apparatus, as shown in FIGS. 3 and 4, are usually composed of a pressing member equipped with a high-frequency coil 22 as the heating source (hereinafter "sealing jaw 23"), and a pressing member not equipped with the same but made of a sealing rubber 24 or the like (hereinafter "opposing jaw 25"). Heat-sealing can be achieved by pressing the tubular packing material transversely with the fluid by using said sealing jaw 23 and opposing jaw 25, thereby forming a sealed zone wherein heat and pressure is applied to the thermoplastic resin layer in the innermost face of the packing material.

As the high-frequency heat-sealing apparatus in the present invention, there are no particular limitations as long as a groove 26 inscribed in the end portion on the container's interior side of the sealed zone is provided on the action face of a pressing member equipped with a high-frequency coil, and a flash portion 27 for a molten thermoplastic resin is provided adjacent to the outer side on the cutting side of a sealed zone, and as shown in FIGS. 7 to 9, it is preferable that a sealing rubber 24 comprised of a rigid rubber or the like having a flat action face is formed on the other pressing member, and it is desirable that a magnetic member 28 made of a band-shaped or sheet-shaped ferrite or the like is disposed adjacent to the outer side on the container's interior side of the high-frequency coil having a flat action face. By providing this band-shaped magnetic member 28 formed adjacent to the outer side on the container's interior side, the magnetic lines of force, as emitted from the high-frequency coil, are deflected toward the sealed zone by the magnetic member 28 so that the outer side of the tubular packing material, as located at the high-frequency coil on the container's interior side, that is, the outer side on the container's interior side of the sealed zone is not heated to an unnecessary temperature.

In the high-frequency heat-sealing apparatus, as mentioned above, a high-frequency heating mechanism is used as means for heating a tubular packing material, and this high-frequency heating mechanism is equipped with a high-frequency coil 22, as mentioned previously. FIG. 5 is a diagram explaining a sealed zone when high-frequency heat-sealing is effected, and FIG. 6 is an enlarged diagram of a portion of its former. As shown in FIGS. 5 and 6, when an electric current flows in a high-frequency coil 22 formed in the sealing jaw 23, a high-frequency electromagnetic field is generated around the high-frequency coil and induces an eddy current in a conductive material such as an aluminum foil so that heat is generated in the conductive material by the eddy current, to heat and melt a thermoplastic resin adjacent to the conductive material. The eddy current thus induced forms a round electric circuit at the two end portions of the conductive material such as the aluminum foil, thereby rounding the heated regions of the two right and left side portions of the tubular packing material 21 and the width of the thermoplastic material layer to be melted at the two end portions is narrowed. As a result, the sealed zone is rounded and narrowed at its two right and left side portions 29 in the longitudinal direction and the width of the sealed zone is made narrower than at its non-side portion 30.

In the present invention, the sealed zone is termed as the heat-sealed zone in which heat and pressure are applied to the thermoplastic resin layers of the innermost faces of the packing material, and the region which is pressed but not heated, or the region which is heated but not pressed, cannot be said the sealed zone. Moreover, in the aforementioned FIGS. 5 and 6 and the FIGS. 7 to 9 to be described hereinafter, the sealed zone is conveniently laid over the sealing jaw 23, when the sealing jaw is equipped with the U-shaped high-frequency coil 22 so that two portions of the tubular packing material are simultaneously heat-sealed through a portion 31 to be cut. Of the end edge portions of the heat-sealing apparatus of this kind in the direction (or the longitudinal direction of the tube) perpendicular to the longitudinal direction (or the transverse direction of the tube) of the sealed zone, as shown in FIGS. 5 and 6, one end edge portion 32 is located on the side of a filler such as juice, that is, on the end portion 32 of the container's interior side, whereas the other end edge portion 33 is located on the cutting side end portion 33 for cutting off the containers one by one. Here in this invention, the action face of the high-frequency coil of the pressing member corresponding to said sealed zone may be conveniently called the sealed zone.

As a groove 26 inscribed in the end portion on the container's interior side of a sealed zone of the high-frequency heat-sealing apparatus in the present invention, there are no particular limitations as long as an inflow portion for a molten thermoplastic resin in the region adjacent to the container's interior side is formed at the inner side of the sealed zone, including the two right and left side portions 29 where the width of the sealed zone is rounded and narrowed. A groove which is inscribed in the end portion on the container's interior side of a sealed zone which is provided wholly or partially along the longitudinal direction of the container's interior side of a sealed zone can be exemplified, however, as shown in FIGS. 7 to 9, it is preferable that it is extended over the whole area of the longitudinal direction, along the container's interior side of the sealed zone. In this case, a groove 26 having a curved shape is provided at the two right and left side portions 29 where the width of the sealed zone is rounded and narrowed. A polygonal-shaped groove can be an alternative to this curve-shaped groove. The shape of the groove can be exemplified as its shape of the cross section being such as arcuate, ellipsoidal, polygonal, (triangular, rectangular, trapezoidal or the like), but a cross section that is arcuate and its depth being no greater than one half, for example, about one third, of its width is preferable. It is preferable to provide two continuous grooves 26 inscribed in the end portion on the container's interior side of the action face which is to become both inner sides of the container's interior side of the sealed zone, when a high-frequency coil in U-shape or the like is provided on the sealing jaw, and two portions of the tubular packing material are heat-sealed simultaneously through a portion 31 to be cut.

As to the aforementioned groove 26, it is preferable to set the width and depth of the groove in advance, so that a linear sealed edge with no corrugation is formed and is filled with the thermoplastic resin in the sealed zone that had flown, and cracks are not generated from sealed edge that is linear and has no corrugations. Moreover, it can be said that the portion of groove 26 where the thermoplastic resin had flown in does not contribute as much to sealing performance since it contains contaminants such as dietary fiber, but increases the sealing strength. In addition, from the standpoint of preventing the formation of a tunnel that penetrates the sealed zone, which is a cause for defective sealing, it is preferable that the width of the groove is changed partially for example, in the two longitudinal end portions 34 of a sealed zone, in the crease portion (fold line) 35 of a laminate packing material, and in the longitudinal sealed portion 36 wherein the laminate packing material is in three-ply, or the like. By partially changing the width of the groove, the flow state of a molten thermoplastic resin, such as the flow speed of the resin or the proportion of the amount of flow of the molten resin to the groove to the amount of flow of the molten resin from the flash portion or the like as an example, can be controlled. FIG. 9 shows a groove 26 wherein its width has become slightly broader and its depth has become slightly shallower at the aforementioned crease portion 35.

In the present invention, the flash portion 27 for the molten thermoplastic resin, formed adjacent to the outer side on the cutting side of the high-frequency coil, may be anything which has the structure to guide the molten thermoplastic resin to flow from the sealed zone to the cutting side. As shown in FIGS. 3 and 7, for example, one constructed in a manner wherein the end edge portion on the cutting side of the action face of a sealing rubber 24 formed on the opposing jaw 25 is contacted to the end edge portion on the cutting side of the action face of a high-frequency coil 22 formed on the sealing jaw 23 can be exemplified. In addition, as shown in FIGS. 4 and 8, one constructed as a groove which can form a molten thermoplastic resin puddle provided on the action face adjacent to the outer side on the cutting side of the high-frequency coil can also be used as a flash portion 27. When the flash portion 27 is constructed as a groove, the end edge portion on the cutting side of the action face of the sealing rubber 24 can be extended toward the outer side on the cutting side of the sealed zone so that it covers a portion of the groove, and in this case, liquid such as juice that remains in the portion 31 to be cut or near said portion can be minimized, when the pressing members 14 and 15 press the tubular packing material 21 with a fluid, thereby preventing the fluid such as juice or the like from being exuded to the edge of the paper being cut, and this is effective for countermeasures against fungus in the end of the paper. Moreover, since the high-frequency coil side of said molten thermoplastic resin flash portion 27 is heated but not pressed, it enables the molten thermoplastic resin to flow from the sealed zone.

As described hereinbefore, the high-frequency heat-sealing apparatus in the present invention is comprised of a groove 26 formed on the action face of the sealing jaw 23, adjacent to the inner side of the container's interior side end portion of a sealed zone where its two right and left portions are rounded and narrowed, to form a linear sealed edge by the molten thermoplastic resin flowing in, and further comprised of a flash portion 27 for a molten thermoplastic resin formed adjacent to the outer side on the cutting side of a high-frequency coil. Hereby the thermoplastic resin layer in the innermost face of the packing material in the sealed zone is heated and pressed by the pressing action of the sealing jaw 23 and opposing jaw 25 equipped with a heating mechanism, and the molten thermoplastic resin flows in and out of the groove 26 and flash portion 27, and flows toward the container's interior side and cutting side together with the filler such as juice containing water-insoluble vegetable fiber and contaminants such as dirt that had adhered to the surface of the thermoplastic resin layer, and the molten thermoplastic resin that had flown towards the container's interior side flows into the groove 26 to form a linear sealed edge, and the molten thermoplastic resin that was extruded toward the cutting side flows to the flash portion 27 and forms a thermoplastic resin puddle. Consequently, a thin layer of thermoplastic resin having an excellent sealing where there are no contaminants on the action face which is not provided with a groove 26 of the sealed zone is formed.

Using the high-frequency heat-sealing apparatus in the present invention enables to achieve excellent heat-sealing, wherein defective sealing is not produced even when heat-sealing under severe conditions with a fluid, such as when filling/packing a vegetable juice abundant in water-insoluble vegetable fiber. The details of the mechanism for achieving this excellent heat-sealing is not clear, however, in the high-frequency heat-sealing apparatus in the present invention, the flow state of the molten thermoplastic resin, such as the flow speed of the resin or the proportion of the amount of molten resin that flowed into the groove to the amount of molten resin that flowed from the flash portion for example, can be controlled by setting the width and depth of the groove 26 inscribed in the end portion on the container's interior side of the sealed zone in advance so that the flow property of the molten resin is optimized, especially by setting the flow property of the molten resin to make it optimized by partially changing the width of the groove 26. Consequently, it is believed that the flow of the molten resin which flows out to the groove 26 of the container's interior side and the molten resin extruded to the cutting side becomes smoother, thereby attaining a satisfactory heat-sealing even when heat-sealing under severe conditions with a fluid.

INDUSTRIAL APPLICABILITY

Heat-sealing with the use of a high-frequency heat-sealing apparatus in the present invention enables to achieve excellent heat-sealing, wherein a thin layer of thermoplastic resin having an excellent sealing where there are no contaminants in the sealed zone is formed, and no defective sealing is produced even when heat-sealing under severe conditions with a fluid, such as when filling/packing a vegetable juice or the like abundant in water-insoluble vegetable fiber. Moreover, the high-frequency heat-sealing apparatus in the present invention does not have a ridge on its action face, which enables to extend the replacement period, making the work life longer. It can also form a sealed zone of a thin layer which does not include a wide range of fiber, thereby effectively preventing a tunnel.

EXPLANATION OF NUMERALS

| | |
|---|---|
| 1 | Packing material web |
| 2 | Liquid supply pipe |
| 3 | Pillow-shaped container |
| 4 | Transverse sealing apparatus |
| 5 | Cutting apparatus |
| 6 | Box-shaped container |
| 10 | Vertical rod |
| 11 | Lift frame |
| 12, 13 | Rocking arm |
| 14, 15 | Pressing member |
| 16 | Arm opening/closing device |
| 20 | Press apparatus |
| 21 | Tubular packing material |
| 22 | High-frequency coil |
| 23 | Sealing jaw |
| 24 | Sealing rubber |
| 25 | Opposing jaw |
| 26 | A groove inscribed in the end portion on the container's interior side of a sealed zone |
| 27 | Thermoplastic resin flash portion |
| 28 | Magnetic member |
| 29 | Right and left side portion of the longitudinal direction of a sealed zone |
| 30 | Non-side portion of the longitudinal direction of a sealed zone |
| 31 | Portion to be cut |
| 32 | End portion on the container's interior side |
| 33 | End portion on the cutting side |
| 34 | Two end portions of the longitudinal direction of a sealed zone |
| 35 | Crease (fold line) portion of a laminate packing material |
| 36 | Longitudinal sealed portion of a laminate packing material in three-ply |

What is claimed is:

1. A high-frequency heat-sealing apparatus for making a container shaping a packing material of a laminate including a thermoplastic resin layer and a conductive material layer in a tubular shape, said packing material defining a longitudinal direction and a transverse direction, and for heat-sealing said tubular packing material transversely together with a fluid and cutting an end portion of the container, thereby defining an sealed one, interior side, outer side and cutting side with respect to the container, comprising:

a first pressing member; and a second pressing member openable and closable together with said first pressing member, wherein, each of the first and second pressing members having a flat action face, wherein one of said first and second pressing members including a high-frequency heating mechanism, a surface of said heating mechanism being flush with the action face and defining a portion of the action face, wherein a groove is formed on the action face of the pressing member which had been equipped with said high-frequency heating mechanism, said groove being inscribed in the end portion inside the sealed zone, and wherein a flash portion for a molten thermoplastic resin is formed adjacent to the outer side on the cutting side of the sealed zone wherein the groove extends over the whole area of the transverse direction along the container's interior side of the sealed zone, and includes a partial curve in the end portion.

2. The high-frequency heat-sealing apparatus according to claim 1, wherein the pressing member which does not include the high-frequency heating mechanism is a sealing rubber having an action face.

3. The heat-sealing apparatus according to any of claim 1 or 2, wherein the cross section of the groove is arcuate, and the depth of the groove is no greater than one half of its width.

4. The high-frequency heat-sealing apparatus according to any of claim 1 or 2, wherein a band-shaped magnetic member is provided adjacent to the outer side on the container's interior side of a high-frequency coil.

5. The high-frequency heat-sealing apparatus according to claim 1, wherein the pressing member which does not include the high-frequency heating mechanism is a sealing rubber having an action face.

6. A high-frequency heat-sealing apparatus for making a container shaping a packing material of a laminate including a thermoplastic resin layer and a conductive material layer in a tubular shape, said packing material defining a longitudinal direction and a transverse direction, and for heat-sealing said tubular packing material transversely together with a fluid and cutting an end portion of the container, thereby defining an sealed zone, interior side, outer side and cutting side with respect to the container, comprising:

a first pressing member; and a second pressing member openable and closable together with said first pressing member, wherein, each of the first and second pressing members having a flat action face, wherein one of said first and second pressing members including a high-frequency heating mechanism, a surface of said heating mechanism being flush with the action face and defining a portion of the action face, wherein a groove is formed on the action face of the pressing member which had been equipped with said high-frequency heating mechanism, said groove being inscribed in the end portion inside the sealed zone, and wherein a flash portion for a molten thermoplastic resin is formed adjacent to the outer side on the cutting side of the sealed zone, wherein width of the groove partially differs.

7. The high-frequency heat-sealing apparatus according to claim 6, wherein the groove extends over the whole area of the transverse direction along the container's interior side of the sealed zone, and includes a partial curve in an end portion.

8. The heat-sealing apparatus according to any of claim 6, wherein the cross section of the groove is arcuate, and the depth of the groove is no greater than one half of its width.

9. The high-frequency heat-sealing apparatus according to claim 6, wherein a band-shaped magnetic member is provided adjacent to the outer side on the container's interior side of a high-frequency coil.

* * * * *